US005542327A

United States Patent [19]
Schultz

[11] Patent Number: 5,542,327
[45] Date of Patent: Aug. 6, 1996

[54] WIRE STRIPPING APPARATUS

[76] Inventor: Roger Schultz, 510 Alfred St., Elgin, Ill. 60120

[21] Appl. No.: 183,023

[22] Filed: Jan. 18, 1994

[51] Int. Cl.⁶ .................................................. H02G 1/12
[52] U.S. Cl. .............................. 83/861; 83/426; 83/431; 83/947; 29/426.4; 29/825; 81/9.51
[58] Field of Search .......................... 83/861, 879, 880, 83/881, 886, 887, 924, 947, 425, 426, 431, 433; 81/9.4, 9.51; 29/825, 426.4, 564.4

[56] References Cited

U.S. PATENT DOCUMENTS

| 2,391,721 | 12/1945 | Lundeen | 83/924 X |
|---|---|---|---|
| 3,175,430 | 3/1965 | Smith et al. | 81/9.51 |
| 3,316,781 | 5/1967 | Bignell et al. | 83/924 X |
| 3,641,852 | 2/1972 | Terada | 83/924 X |
| 3,817,132 | 6/1974 | Emery | 83/105 |
| 4,015,497 | 4/1977 | Burgess | 83/924 X |
| 4,187,745 | 2/1980 | Lambert | 81/9.5 |
| 4,345,362 | 8/1982 | de Givry | 29/426.5 |
| 4,352,305 | 10/1982 | Rodenbeck | 81/9.51 |
| 4,534,254 | 8/1985 | Budzich et al. | 83/924 X |
| 4,584,912 | 4/1986 | Gudmestad | 81/9.5 |
| 4,597,176 | 7/1986 | Shields | 29/829 |
| 4,614,135 | 9/1986 | Ito | 81/9.51 |
| 4,699,027 | 8/1987 | Guyette | 81/9.51 |
| 5,105,702 | 4/1992 | Fara | 83/947 X |
| 5,107,735 | 4/1992 | Ramun et al. | 83/947 X |
| 5,211,093 | 5/1993 | Horniak | 83/426 |

FOREIGN PATENT DOCUMENTS

216565   12/1984   Germany ................................ 83/861

Primary Examiner—Eugenia Jones
Attorney, Agent, or Firm—Stephen A. Litchfield

[57] ABSTRACT

A machine for stripping insulation lengthwise from electric or other type of cables on a continuous basis having a circular blade rotably mounted to a support assembly and positioned adjacent an input wheel, the input wheel designed to movably push or pull insulated cable lengthwise through the circular blade and adjacent a positioning wheel disposed beneath said circular blade, threaded rods mounted in and threaded through the support assembly for adjusting the positioning wheel and the roller wheel such that varying diameters of insulated cable may be stripped, the machine further having an electric motor mounted to the support apparatus to drive the input wheel and to drive a gear assembly which drives the circular blade.

16 Claims, 5 Drawing Sheets

WIRE STRIPPING APPARATUS

BACKGROUND OF THE INVENTION

1. Field of the Invention

This invention relates to a machine for stripping rubber, plastic or other flexible insulation from elongate electrical wire or cable, such as machines operated by electrical motors and utilizing a blade for cutting the insulation.

2. Description of Related Art Including Information Disclosed Under 37 CFR §1.97–1.99

Insulated electrical cable is used in many applications in home construction, and in commercial and industrial buildings. It is also used in great quantities in the utility area for the conducting of electricity for a variety of uses. Scrap electrical wire and cable can be recycled or reclaimed for the copper or other metals that are contained therein. Salvage yards generally pay a higher price for electrical wire and cable that has the insulation already stripped therefrom. Thus, prior attempts have been made to provide a machine that will strip the insulation off of electrical cable to facilitate the recycling of the metal insulated therein. One such machine for stripping insulation from cables is shown in U.S. Pat. No. 3,817,132 issued Jun. 18, 1974 to Emery, entitled "Machines For Stripping Insulation From Cables". This patent discloses a very complex machine with multiple moving parts designed to strip the insulation off of a cable. The patent shows a pair of circular cutters and a variety of gears and other moving parts. This machine is complex and expensive to manufacture.

Other machines have been used to strip the insulation off of a cable in sections to facilitate electrical connections. In U.S. Pat. No. 4,699,027 to Guyette issued Oct. 13, 1987 a cable stripping apparatus is illustrated to strip insulation off of cable ends to facilitate electrical connections. This cable stripping apparatus has numerous moving parts and is also expensive to manufacture. It appears to be designed for use in a factory or industrial setting where larger capital expenditures are more common. It is not usable for stripping elongate sections of insulation off of a cable.

U.S. Pat. No. 4,597,176 to Shields issued Jul. 1, 1986 entitled "Method For Removing Insulation From Flat Cable", illustrates a device for removing in sections insulation from a flat cable to allow the cable to be connected in selected lengths to terminals for making electrical connections. This machine can not remove elongate sections of insulation from electrical cable for the purpose of salvaging the metal insulated therein.

Other patents include U.S. Pat. No. 4,352,305 to Rodenbeck issued Oct. 5, 1982; U.S. Pat. No. 4,614,135 to Ito issued Sep. 30, 1986; U.S. Pat. No. 4,345,362 to deGivry issued Aug. 24, 1982; U.S. Pat. No. 4,187,745 to Lambert issued Feb. 12, 1980; and U.S. Pat. No. 4,584,912 to Gudmestad issued Apr. 29, 1986 all illustrating a variety of machines for stripping insulation off of electrical cable. All of these patents disclose complicated devices requiring many moving parts to accomplish the stripping of the insulation off the cable. Many of these patents relate to stripping insulation off of cable transversely to facilitate electrical connections and not to stripping insulation lengthwise off of the cable.

Thus, prior wiring stripping apparatus are relatively complicated devices with numerous moving parts. Further, they are expensive to manufacture making it difficult for the average electrician or small salvage yard to afford. Also, many do not appear to be easily portable so as to be useable in a variety of locations. Further they are not designed to strip insulation off of cable lengthwise.

Further problems are often encountered in removing insulation from different sized cables having different sizes of cores and different thicknesses of insulation. Not only do insulations differ in thickness and kind but also some insulations are more difficult to remove than others. Prior art machines are complex mechanisms utilizing complicated means for feeding a length of wire into the machine and for measuring wire length and thickness. They generally employ cams, levers, and switches to control the many operations of the machine. As a result, prior machines are expensive, complicated assemblies and are prone to malfunction. Further, many require a skilled operator to operate the machine.

SUMMARY OF THE INVENTION

It is therefore a principal object of the invention to provide a wire stripping apparatus containing few moving parts that will continuously remove in a lengthwise fashion the outer insulation from an electrical cable, said apparatus being relatively simple and comparatively less expensive to manufacture than prior art machines. It is another object of the present invention to provide a wire stripping apparatus that, once set up and started, will run without further assistance and continually strip long lengths of insulated wire for salvage purposes. It is another object of the present invention to provide a wire stripper apparatus that is easily portable and can be used by a layman, electrician or plant maintenance personnel with a minimum of instruction for stripping spare lengths of electrical wire not used on jobs or in other construction settings. It is another object of the present invention to provide a wire stripping apparatus that, with little adjustment will accommodate varying diameters of cable, and varying thicknesses of insulation.

The objects of the invention are achieved by providing a wire stripping apparatus which is controlled by an electric motor having an axle projecting therefrom, said axle projecting at its distal end through a part of a support assembly. Said motor also mounted to the support assembly. Mounted to the axle is an input or drive wheel. Connected at the distal end of the axle are a series of gears which drive a cutter wheel. The input wheel is positioned so as to rotably draw a length of insulated wire through the cutter wheel. Beneath the cutter wheel and positioned such that the insulated cable rests thereon is a positioning wheel which is removable and which is capable of containing varying diameters of electrical cable. A roller wheel is provided beneath the input wheel. Adjustment means are provided for both the roller wheel and the positioning wheel to adjust the distance between the roller wheel and the input wheel, and to adjust the distance between the positioning wheel and the cutter wheel to accommodate different sizes of insulated cable. By providing access moans at the distal end of the axle of the cutter wheel, such that the gears are exposed when the access means is removed, a means for servicing the gears is easily provided. It is anticipated that such service work may be done by a layman on site, eliminating the need to send the entire apparatus to a repair shop for repairs.

The wire stripper apparatus of the present invention is portable and is easily moved from one job site to another. Also it is designed such that it may be clamped to a table top at an electrician's or other user's shop for running lengths of scrap cable at the conclusion of a day's work.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
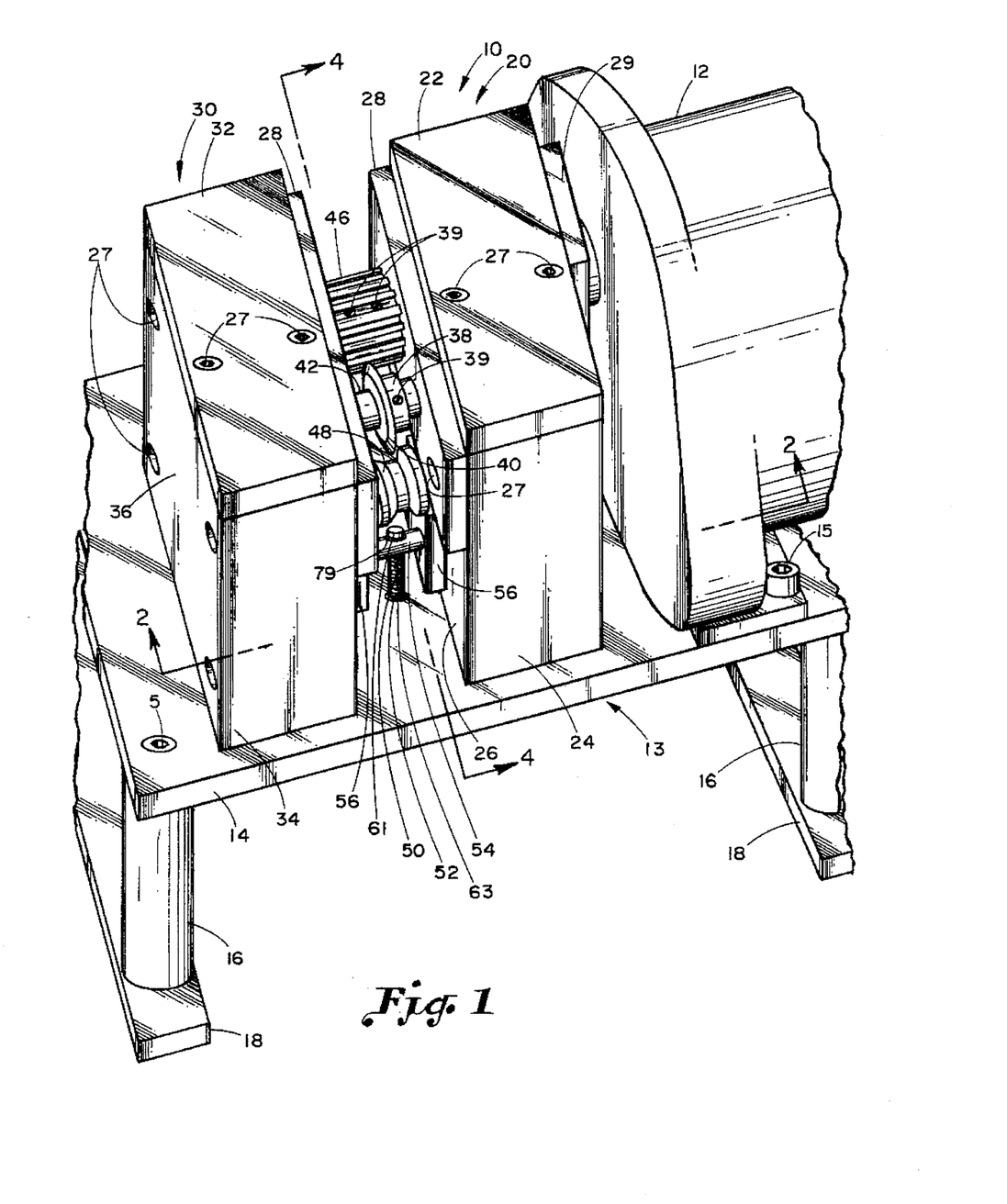
FIG. 1 is a front and top perspective view of the cutting section of the wire stripping machine and illustrates the insulation cutting area of the apparatus.

Referring to FIG. 1, a wire stripping apparatus 10 is shown having electric motor 12 mounted to a support assembly 13 and controlled by a standard electrical on-off switch (not shown). Said support assembly 13 having a base plate 14, tubular support members 16 and flat supports 18. Allen bolts 15 are used to secure the support assembly 13.

Mounted to the base plate 14 are two separate housings. Axle housing 20 contains the drive shaft 17 of the motor. Axle housing 20 has top member 22 placed over front member 24 and side members 26. Drive shaft guard 29 is used to space the electric motor 12 in relation to the axle housing 20 and to protect the drive shaft 17. Side spacers 28 are used to space the axle housing 20 with respect to the wire stripping section of the wire stripper machine 10.

Adjacent the axle housing 20 and connected to the drive shaft 17 of electric motor 12 is coupler 21, which in turn is connected to axle 69. Input wheel 46 is secured to axle 69, shown in FIG. 6, by two set screws 39. Axle 69 is comprised of steel. Shown adjacent the input wheel 46 and in spaced relation thereto is cutter wheel 38 having a sharpened edge 40 thereon. Edge 40 is sharpened to a 60 degree included angle. Cutter wheel 38 is comprised of steel which is 60 Rockwell hardened. A Rockwell hardness rating of between 60 and 62 is preferred. A Rockwell hardening rating which is too low will require edge 40 to be resharpened too often while a rating in excess of 62 Rockwell may make edge 40 too brittle. Cutter wheel 38 is secured to cutter wheel shaft 42 by set screw 39. Disposed immediately beneath cutter wheel 38 is positioning wheel 48. Wheels 46, 38 and 48 are all rotably mounted to the axle housing 20.

The gear housing 30 is connected adjacent the wire stripping center section of wire stripper 10. Gear housing 30 has top member 32, front member 34 and side members 36. Both axle housing 20 and gear housing 30 are made of ½ inch aluminum plate, however, other similar materials such as steel, some plastics or fiber board may also be used, and define an open area therein to house components of the wire stripping apparatus 10. Other components of the assembly may also be comprised of ½ inch aluminum plate, which is generally lighter than steel, thereby reducing the weight of the apparatus. Axle housing 20 and gear housing 30 have members secured together by Allen screws 27. Both axle housing 20 and gear housing 30 are rigidly fixed to base plate 14 and are non-moveable.

The wire stripping apparatus 10 has an adjustment feature in that threaded shaft 50 is disposed within base plate 14 through opening 52 and threaded steel insert 63, and has its distal end fixed to adjustment bar 54 by shoulder bolt 61. Adjustment bar 54 is horizontally aligned with respect to base plate 14 and connects with a pair of adjustment spacers 56. Thus, by rotating threaded shaft 50 within threaded steel insert 63, adjustment spacers 56 are moved up or down with respect to base plate 14 and with respect to cutter wheel 38. Threaded steel insert 63 is necessary to prevent stripping of threads. If the opening 52 in the aluminum base plate 14 had been threaded to mate with bolt 50, the aluminum threads would soon strip and wear out. Thus the threaded steel insert 63 helps insure the long term usefulness of the machine 10.

Gear housing 30 contains a series of gears which will be described in more detail below. These gears rotate the cutter wheel 38 as the drive shaft of motor 12 is rotated. Thus, when operated, electric motor 12 will turn the drive shaft 17 and input wheel 46 and the gear assembly in gear housing 30 will cause cutter wheel 38 to also turn. Insulated wire or cable is then inserted into the area beneath drive wheel 46 and due to the rotation of the wheel it is pushed through cutter wheel 38 and adjacent positioning wheel 48. Insulated cable may be first inserted through the positioning wheel 48 and cutter wheel 38 and pulled by the rotation of drive wheel 46 as the cable is compressed between the drive wheel 46 and the roller wheel 47. Threaded shaft 50 can be adjusted so as to raise or lower the positioning wheel 48 with respect to cutter wheel 38. Threaded shaft 50 can comprise a thumb screw with a wing nut to hold threaded shaft 50 in place. Positioning wheel 48 is rotably mounted in adjustable spacers 56. Adjustment of the spacers 56 is then accomplished with respect to base plate 14, thereby adjusting the positioning wheel 48 with respect to the cutter wheel 38. A similar threaded shaft 50, shown in FIG. 4, for adjusting the roller wheel 47 is also provided to adjust the compression of the cable between drive wheel 46 and roller 47.

It should be noted that drive wheel 46 has a corrugated outward appearance so as to facilitate the gripping of insulated cable and driving it into or pulling it through cutter wheel 38. Drive wheel 46, in one embodiment, would have a diameter of 1.5 inches, with the teeth or corrugations having a 60 degree included angle, 10 degrees apart and 0.060 of an inch deep. Cutter wheel 38 is also 1.5 inches in diameter to edge 40 and has a 60 degree included angle at edge 40.

Figure 2:
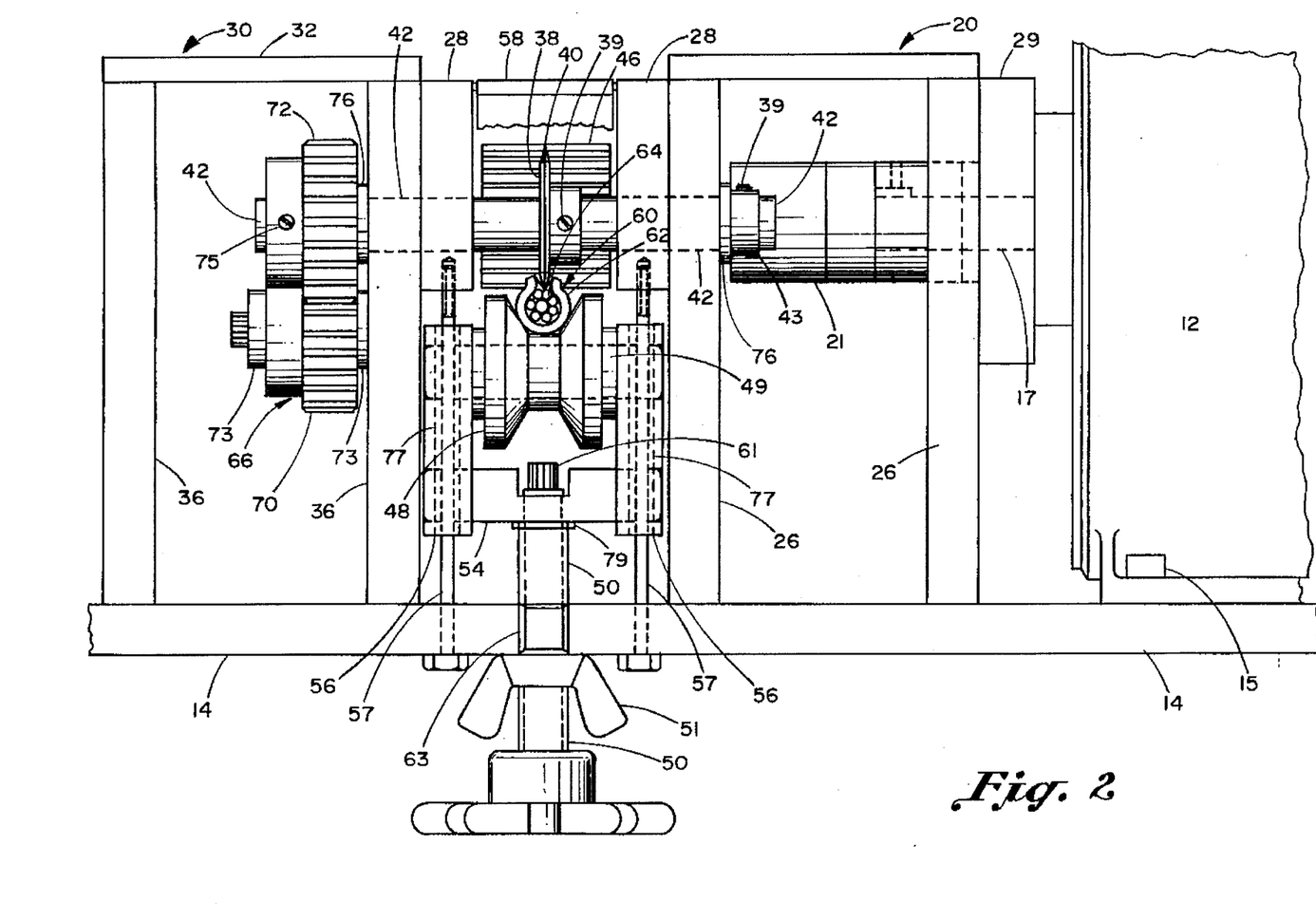
FIG. 2 is a front view of the wire stripping machine, illustrating the process of cutting the insulation off of the core of an electrical cable.

Referring now to FIG. 2 of the drawings, an interior view is shown of both axle housing 20 and gear housing 30. Also, the wire stripper 10 is shown with cable 60 aligned on positioning wheel 48 having the insulated covering 62 split by the sharpened blade 40 of cutter wheel 38 so as to expose the interior copper core 64 of cable 60.

In FIG. 2 further illustration is seem of the adjustment apparatus for adjusting the cable 60 with respect to the cutter wheel 38. The adjustment apparatus having threaded shaft 50 connected to the adjustment bar 54. Adjustment bar 54 is maintained in a horizontal parallel relation to base plate 14 and is mounted at the distal ends thereof spacers 56. Positioning wheel 48 is mounted within spacers 56 by means of shaft 49. Shaft 49 is made of steel and is freely rotatable within openings in spacers 56 to as to allow positioning wheel 48 to rotate with respect to the spacers 56 as cable 60 is driven therethrough. Guides 57 are shown inserted through base plate 14 such that spacers 56 may travel freely up and down the length of guides 57 through bushings 77. Guides 57 are threaded into spacers 28, both spacers 28 being adjacent the axle housing 20 and gear housing 30 of wire stripper apparatus 10. Guides 57 maintain the spaced parallel relationship of guides 56 to one another such that positioning wheel 48 and shaft 49 are maintained in a spaced parallel relation to base 14.

FIG. 2 further illustrates the relationship of input or drive wheel 46 and cutter wheel 38. It is seen that input wheel 46 is designed so as to either push cable 60 into positioning wheel 48, which is adjusted so as to allow the blade 40 of cutter wheel 38 to split the insulated cable, or pull cable 60 through cutter wheel 38 depending upon which end of the apparatus 10 cable 60 is inserted through.

FIG. 2 also shows the drive shaft 17 of electric motor 12 projecting into axle housing 20. In axle housing 20 drive shaft 17 is attached to a coupler or shaft protection device 21, such as a Lovejoy™, shaft protector, designed to prevent shaft 17 or electric motor 12 from damage caused by blockage of the wire stripper apparatus while motor 12 is running. The shaft protection device 21 breaks apart at a certain level of torque, thereby protecting the electric motor 12 and drive shaft 17. A set screw and keyway, are used to secure the coupler 21 to the drive shaft 17. A pair of set screws, not shown, are used to secure the coupler 21 to axle 69 and are spaced 90 degrees apart.

Cutter wheel shaft 42 is shown in FIG. 2 spaced and rotably mounted in axle housing 20 through side member 26. Connected to shaft 42 is collar 43 which is secured to shaft 42 by set screw 39. Collar 43 prevents shaft 42 from floating between gear housing 30 and axle housing 20. Cutter wheel shaft 42 also projects at its other end through side member 36 of gear housing 30. Cutter wheel shaft 42 projects into gear housing 30 such that gear 72 is rotably mounted thereon.

FIG. 2 also illustrates the side view of the interior gear assembly 66 of gear housing 30. Cutter wheel gear 72 is shown mounted on cutter wheel shaft 42. Cutter wheel gear 72 mates with pinion gear 70. Not shown is drive gear 68 which is mounted on axle 69 as shown in more detail in FIG. 6.

Also shown in FIG. 2 is plastic shield 58 rotably mounted over the cutter apparatus. Plastic shield 58 is manufactured of a clear, strong plastic material allowing an operator to view the operation of the cutter wheel 38 and input wheel 46 yet protecting the operator from fragments that may fly off of the cutter wheel 38 and protecting the operator's hands from contact with sharpened circular blade 40.

Once adjusted for cutting insulated cable 60, threaded shaft 50 has its position fixed with respect to base plate 14 and cutter wheel 38 by wing-nut 51 which is turned tightly up against base plate 14. The gear assembly 66 is shown in further detail in FIG. 3. Cutter wheel gear 72 is driven by pinion gear 70 which in turn is driven by drive gear 68. Drive gear 68 is mounted on axle 69. Axle 69 is connected to the Lovejoy™ axle saver or coupler 21 in axle housing 20.

Figure 3:
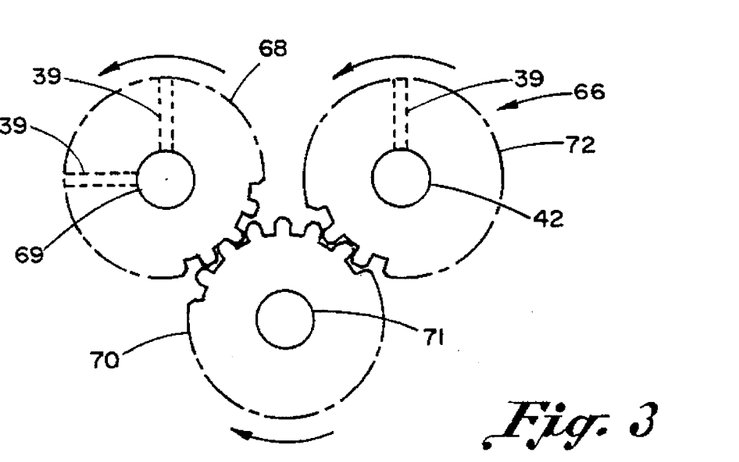
FIG. 3 is a side view of the gear mechanism of the wire stripping machine and shows the direction of rotation of the gears.

Gears 68, 70, and 72 are standard size spur gears. The shaft protection device 21 and axle 69 are rotably driven by drive shaft 17 of electric motor 12.

FIG. 3 illustrates with arrows the directions of rotation of the gears when electric motor 12 is operated. It should be noted that apparatus 10 will work with the gears rotating as shown or in the reverse direction. The difference being whether cable 60 is inserted first through drive wheel 46 and driven through cutter wheel 38 or inserted first through positioning wheel 48 and pulled by drive wheel 46 through cutter wheel 38. It is believed that the latter method of inserting cable 60 through positioning wheel 48 and pulling it through cutter wheel 38 by drive wheel 46 is the preferred method of splitting the insulation 62 off of core 64, as the cable 60 is more easily aligned under cutter wheel 38. By varying the sizes of the gears with respect to each other the rate of turn of cutter wheel gear 72 can be changed with respect to that of drive gear 68. While it is not believed that any particular advantage will be gained by causing cutter wheel 38 to rotate at a different speed than that of drive shaft 69, the rotational speed of gear 72 can be changed by changing the diameter of gear 72 with respect to that of gear 70 or gear 68. Standard spur gee may be used for gear assembly 66. In one embodiment equal sized spur gears having a pitch of 16, with a face inch of ½, 24 teeth and a pitch dieter of 1.5 inches are used.

Figure 4:
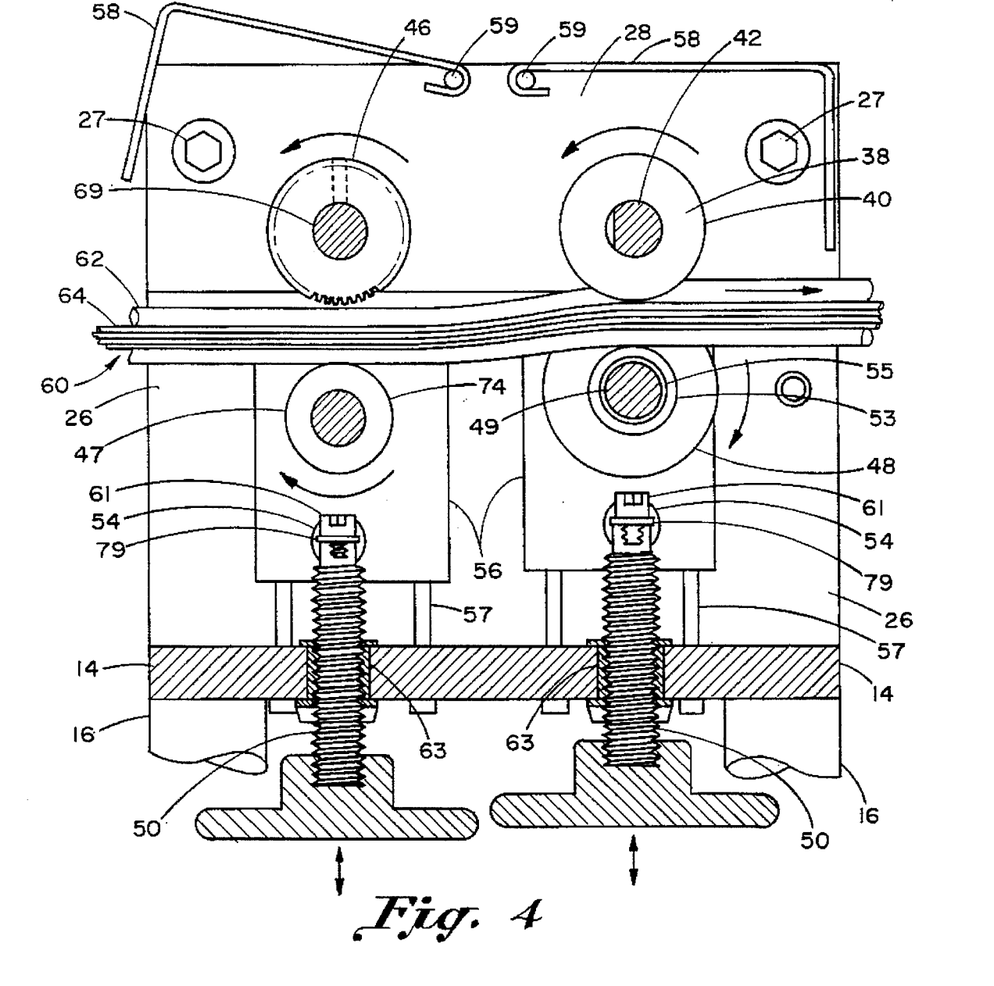
FIG. 4 is a side section view of the wire stripping machine along section lines 4—4 shown in FIG. 1 and further illustrates the operation of the roller assemblies and circular cutter.
Figure 6:
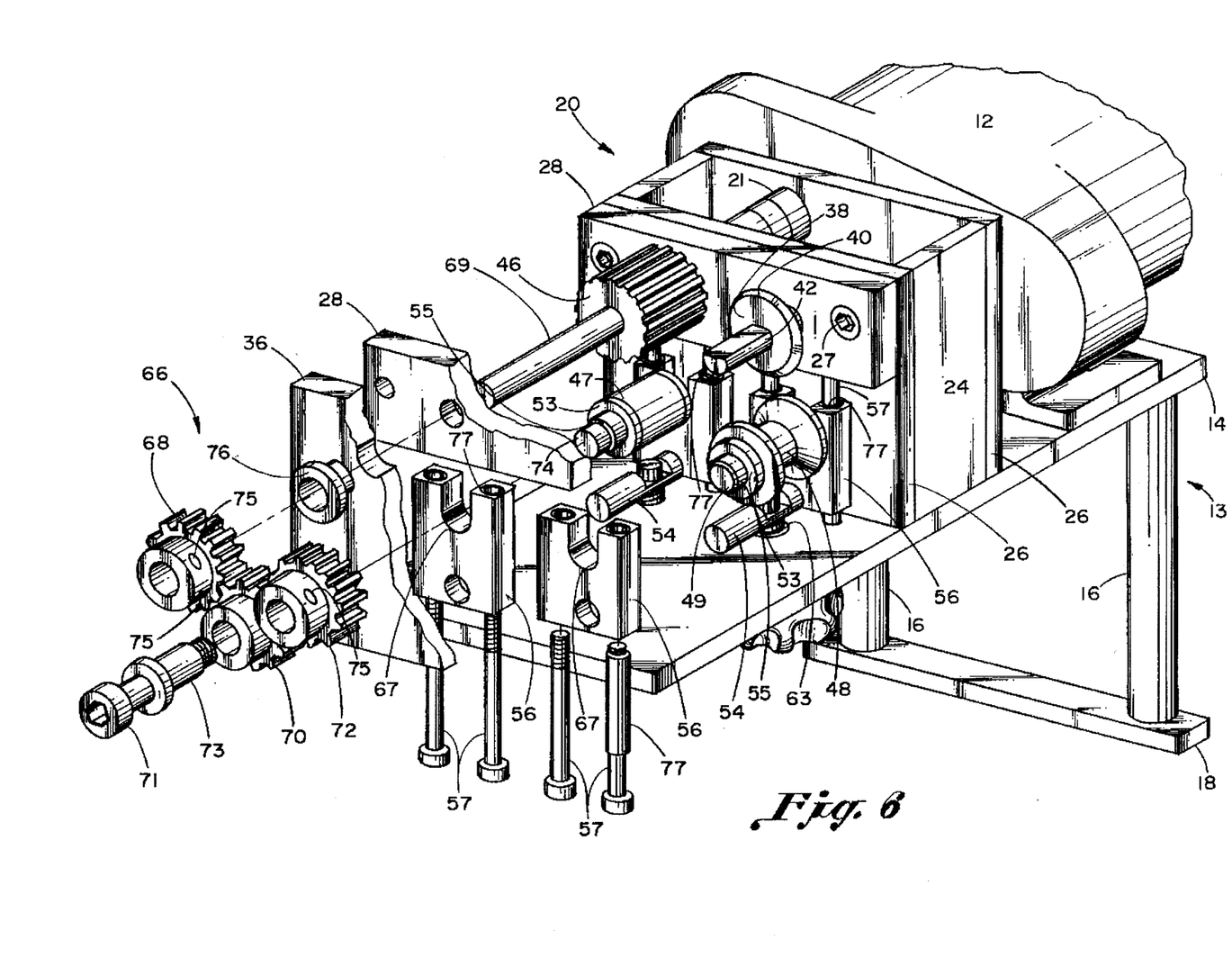
FIG. 6 is a side perspective view, partially exploded, of the wire stripper machine illustrating in greater detail the assembly of parts of the apparatus.

Referring now to FIG. 4, a sectional view of wire stripper apparatus 10 is shown. Sectional view 4 is take along line 4—4 shown in FIG. 1. FIG. 4 illustrates in side detail cable 60 proceeding through the wire cutter apparatus 10. It is noted that drive wheel 46 and roller wheel 47 grip cable 60 over insulation 62. Roller wheel 47 is rotably positioned beneath drive wheel 46 so as to facilitate the movement of cable 60 therethrough. Roller wheel 47 is rotably secured to spacer 56 by shaft 74 and is adjustable against the drive wheel 46 so as to compress cable 60 against drive wheel 46 to facilitate the movement of cable 60 through the wire cutter apparatus. Roller wheel 47 is comprised of aluminum or steel and, in one embodiment, is 1,115 inches long and 1 inch in diameter. The interior of roller wheel 47 is drilled to accommodate a ⅝" bushing 53 and a ½" shaft 74, as shown in FIG. 6.

Cable 60 is driven through positioning wheel 48 which is rotably secured to spacer 56 by shaft 49. Positioning wheel 48 rides around bushing 53 and over shaft 49. Bushings 53 are bronze oil-light bushing used to prevent seizing common to rotating an aluminum wheel about a steel or aluminum shaft. Adjustment spaces 56 are shown adjusted by threaded shafts 50 turned through threaded steel inserts 63 in base plate 14. Both the positioning wheel 48 and the roller wheel 47 each have a set of spacers 56 and threaded shafts 50 for adjusting each wheel against the drive wheel 46 and the cutter wheel 38 to accommodate varying sizes of cable. Guides 57 provide vertical support and stability for each set of spacers 56 so as to keep spacers 56 positioned with respect to the cutter wheel 38 and drive wheel 46. By varying the height of spacers 56 with respect to base plate 14 varying diameters of cable 60 can be accommodated in the wire stripping apparatus.

In FIG. 4 the positioning wheel 48 is shown adjusted such that blade 40 of cutter wheel 38 is splitting insulation 62 of cable 60 to expose the wire core 64. Each threaded shaft 50 has, at its distal end, shoulder bolt 61 threaded into shaft 50 through adjustment bar 54. Bushing 79 is inserted through adjustment bar 54 and receives the threaded end of shoulder bolt 61 so as to secure threaded shaft 50 to adjustment bar 54. Plastic shields 58 are shown rotably mounted at pins 59 so as to cover the cutter wheel 38 and the drive wheel 46 as previously described.

Figure 5A:
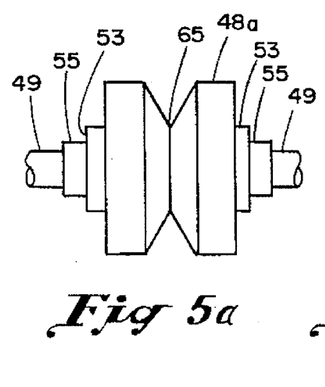
FIG. 5(a) is a side view of the positioning wheel and the collar assemblies and shaft for mounting in the adjusting blocks of the apparatus.
Figure 5B:
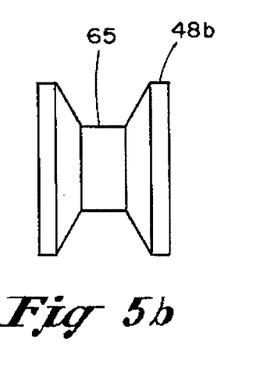
FIG. 5(b) is a side view of a different sized positioning wheel to accommodate a larger diameter cable.
Figure 5C:
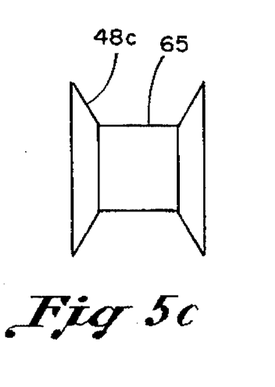
FIG. 5(c) is another side view of yet a different sized positioning wheel to accommodate an even larger diameter cable.

Referring now to FIGS. 5(a), 5(b) and 5(c), a variety of positioning wheels 48(a), 48(b) and 48(c) are shown. They may be made of a variety of materials including aluminum or steel. Each of these positioning wheels have varying interior portions to accommodate different sized diameters of insulated cable. Positioning wheel 48(a) shown in FIG. 5(a) has a 60 degree included angle meeting at center diameter 65. Positioning wheel 48(a) has an outside diameter of 1.5 inches and the center diameter 65 is 0.75 inches. Positioning wheel 48(a) is 1.15 inches wide and will handle insulated wire from sizes 8 gauge through 0. Positioning wheels 48(b) and 48(c) shown in FIGS. 5(b) and 5(c) will accommodate larger sizes of cable and have elongated center portions 65.

FIG. 5(a) illustrates in greater detail the arrangement of bushings 53 and of shaft 49. While only shown in FIG. 5(a), the same assembly would be used with any of the positioning wheels. This arrangement is important as bushing end 55 is designed to fit within U-shaped portion 67 of spacers 56 shown in FIG. 6. This bushing design and assembly facilitates the ability to quickly exchange varying sizes of positioning wheels to accommodate varying sizes of insulated cable.

Referring now to FIG. 6 the wire stripper apparatus 10 is shown in exploded view. Wire stripper apparatus 10 is shown with electric motor 12 having the Lovejoy™ coupler 21 connected within axle housing 20. The relationship of the shaft protection device 21 and drive wheel 46 are also further shown. Drive wheel 46 is shown mounted on axle 69 which projects through spacer 28 and side member 36 into the gear housing 30. Axle 69 mates with collar 76 and gear 68. Gear 68 is secured to axle 69 pursuant to a pair of set screws 75 spaced 90 degrees apart in gear 68. Pinion gear 70 is mated with drive gear 68 and has bushings 73 inserted therein. Shoulder bolt 71 is threaded to the side member 36. Gear 70 rides on a pair of bushings 73 pressed into the center opening of gear 70 and has bolt 71 passed therethrough such that gear 70 does not rub on side plate 36 and rotates fully around bolt 71. Bushing 73 allows pinion gear 70 to rotate freely about bolt 71. Cutter wheel gear 72 mates with cutter wheel shaft 42 and is secured thereto pursuant to set screw 75. Cutter wheel shaft 42 projects through spacer 28 and side member 36 where it mates with gear 72. A similar collar 76, not shown, as is used with gear 68 and axle 69 is used over shaft 42 and pressed into side member 36. Similar collars 76 are pressed into side member 26 for receiving the cutter wheel shaft 42 and the axle 69 at the axle housing 20. Gear 72 is mounted to shaft 42 by set screw 75.

Positioning wheel 48 is mounted on shaft 49 through bushing assembly 53. Bushing assembly 53 mates with adjustment spacer 56 in the U-shaped area 67 of spacer 56. Bushing end 55 of bushing 53 rests in the U-shaped area 67 of adjustment spacer 56 and freely rotates therein. Both sides of positioning wheel 48 have similar bushing assemblies as shown in FIG. 5(a) each of which rests in the U-shaped section of spacer 56.

Likewise, roller wheel 47 has bushing assembly 53 mounted over shaft 74. Bushing assembly 53 has bushing end 55 which rests in the U-shaped section 67 of spacer 56. This arrangement, at each end of roller 47, allows roller 47 to rotate freely within the adjustment spacers 56.

As can be seen all four adjustment spacers 56 are mounted on guides 57. Guides 57 project through base plate 14 and are threaded into side spacers 28.

To change positioning wheel 48, one simply turns threaded shaft 50 so as to lower the adjustment bar 54 and hence the adjustment spacers 56 with respect to cutter wheel 38. The front pair of guides 57 are removed. This clears an opening between positioning wheel 48 and cutter wheel 38 so as to allow positioning wheel 48, and shaft 49 with bushings 53 to be lifted out of the U-shafted openings 67 of spacers 56. The positioning wheel 48, shaft 49 and collar assembly 53 is then removed from the wire stripping apparatus. Shaft 49 is then removed from that particular positioning wheel 48 and re-inserted into another positioning wheel 48 having a different interior size. Bushings 53 are inserted over shaft 49 at each end of positioning wheel 48 and the entire assembly is then re-inserted into the U-shaped sections 67 of adjustment spacers 56. The threaded shaft 50 is then turned to adjust upward the adjustment spacers 56 and the newly inserted positioning wheel 48 with respect to cutter wheel 38 so as to align the area between positioning wheel 48 and cutter 38 with respect to a new diameter of insulated cable 60. Roller 47 is then adjusted upward or downward with respect to drive wheel 46 to cause enough pressure to be exerted against the insulation 62 of cable 60 so as to allow the corrugated ends of drive wheel 46 to either drive the cable 60 into cutter wheel 38 or pull cable 60 through cutter wheel 38 as electric motor 12 is operated.

It should be noted that in order to remove positioning wheel 48 the first exterior set of guides 57 must also be removed from adjustment spacers 56. This allows the bushing assemblies 53 to clear the edges of adjustment spacers 56 and to be removed from the wire stripper apparatus 10.

It should be noted that support assembly 13 has elongate tubular support members 16 secured to flat base members 18. This allows the wire stripper apparatus 10 to be placed on a variety of flat surfaces, including a table top, and clamped thereto by means of a C-clamp or other type clamp. This allows the wire stripper apparatus 10 to be easily portable from one job site to another so long as it is able to be placed on a relatively flat surface. Clamping the apparatus 10 to a flat surface insures that the apparatus will not vibrate or move during operation. It is anticipated that tubular support member 16 and flat supports 18 could be eliminated from the device if the device were to be self-contained in its own enclosure. Room must be left at the bottom of base plate 14 however for threaded shafts 50 to be turned within openings 52 in base plate 14 so as to allow for adjustment of the spacers 56.

Figure 7:
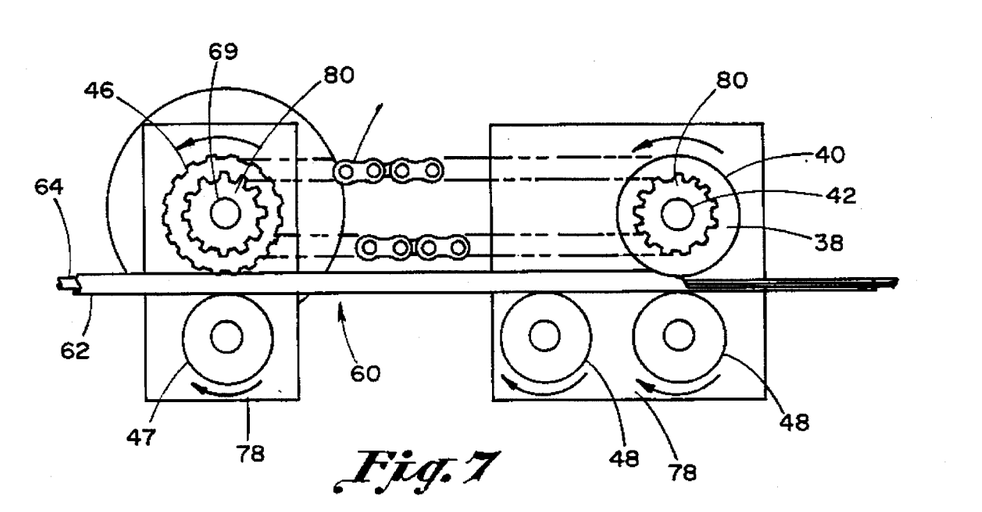
FIG. 7 is an alternate embodiment of the gear mechanism shown in FIG. 3.

FIG. 7 illustrates an alternative embodiment utilizing a chain assembly 82 to drive gears 80. A gear 80 is mounted to axle 69 and a similar gear 80 is mounted to the cutter wheel shaft 42. A pair of positioning wheels 48 would be placed beneath the cutter wheel 38 such that cable 60 is squeezed therein facilitating cutting of the insulated covering 62 by blade 40. Drive wheel 46 would likewise have roller wheel 47 positioned beneath it allowing for adjustment for varying sizes of insulated cable 60. Gears 80 would be mounted to spacers 78 also mounted to the wire stripper assembly 10.

Other alternative embodiments are further contemplated in the present invention, such as gear assembly 66 shown in FIG. 3 could have pinion gear 70 replaced by a drive chain connecting gear 72 with gear 68. While it is felt that a pinion gear 70 is a more reliable and less maintenance prone method of achieving the rotation of cutter wheel 38, either method will work. Also, electric motor 12 and the gear assembly 66 could be reversed, allowing for left-handed operation. Also a smaller or larger version machine 10 can be manufactured. For example a 1/20 horse motor 12 having 115 volts could be used in combination with a capacitor, as well as wheels of a smaller diameter to strip smaller diameter cable. Further, plastic guard 58 could be replaced by a top plastic plate replacing also top members 22 and 32 and allowing the operation within the housings 20 and 30 to be viewed. In another embodiment gear assembly 66 and gear housing 30 could be replaced with a second electric motor to drive cutter wheel 38 and shaft 42. While this embodiment would entail the extra cost and weight of a second motor, it would provide additional power to the apparatus which would be useful for applications in which very large diameter cables are to be stripped.

Another advantage of the present invention is that side members 36 may easily be removed from gear housing 30 by unscrewing Allen screws 27. This allows the gear assembly to be exposed for repair and maintenance without having the entire wire stripping apparatus be returned to the manufacturer.

The electric motor 12 is contemplated as being a Dayton split phase gear motor having a torque of 400 inch pounds, ½ horsepower and running on 115 volts. Thus the assembly may be used in a standard electrical outlet and controlled by a standard electrical switch, not shown.

While the foregoing description has been related to use with respect to an electric motor, the inventive concept applies equally well to any type of drive means for turning or rotating a drive shaft. Other items such as gasoline engines, turbines or other assemblies that will provide circular motion on a continuous basis may be designed to be used with the inventive concept disclosed herein. Further, while there is shown and described the present preferred embodiment of the invention, it is to be distinctly understood that this invention is not limited thereto but may be applied in a variety of ways. For example, as disclosed previously the gear assembly may be changed to incorporate the use of a drive chain. Also, the direction of movement of cable 60 through the input wheel 46 could be reversed so that instead of driving cable 60 through cutter wheel 38 cable 60 could be pulled by input wheel 46 in the opposite direction.

The machine is used by selecting the appropriately sized positioning wheel 48 for the diameter cable to be split and inserting shaft 49 and bushings 53 onto the positioning wheel 48 and then inserting the wheel 48 into the U-shaped sections 67 of adjustment spacers 56, re-inserting the front guides 57 through the outer ends of adjustment spacers 56 and adjusting the positioning wheel 48 by turning threaded shaft 50 with respect to the cutter wheel 38. Threaded shaft 50 of the adjustment spacers 56 for the roller wheel 47 is then turned to adjust spacers 56 to raise or lower roller wheel 47 to create an appropriate amount of pressure between the roller wheel 47 and the input or drive wheel 46. Then, inserting the insulated cable 60 into either end of the machine such that connection is made between the input or drive wheel 46 and the roller wheel 47 readies the machine for operation. The electric motor is then plugged into an electrical outlet and the control switch is activated. This activates the machine and begins the running of a continuous length of elongate insulated cable 60 through cutter wheel 38 and blade 40. As insulated cable 60 is run through the cutter wheel 38 and if the positioning wheel 48 is adjusted correctly, blade 40 will split the insulation 62 from the core 64 of the cable 60. It has been found that by controlling the amount of pressure on the cable 60, by adjusting the roller wheel 47 when the cable 60 is pulled through the cutter wheel 38, that the insulation 62 will peel away from the core 64 without any assistance from the operator of the apparatus. A mache of this type and set up in the manner described is capable of running for hours at a time without further adjustment or attention, thereby stripping many hundreds of yards of insulated cable. The machine of the present invention is capable of handling a wide variety of different sizes of wires and all three commonly used types of rubber or plastic insulation.

It is seen therefore that a simple to operate wire stripping apparatus has been provided allowing for use of and stripping of varying diameters of insulated cable to facilitate salvaging the copper core or other metal core contained therein.

Reference should therefore be made to the appended claims which define the scope of this invention.

I claim:

1. An apparatus for stripping the insulation off of a cable, said apparatus comprising:

a supporting structure having two spaced, parallel planar side members and a planar base member, said spaced side members perpendicularly mounted to said base member such that said base member and said spaced side members form a three-sided enclosure;

a cutting member comprising a circular blade mounted in fixed relation on a cutter wheel shaft, said cutter wheel shaft rotatably mounted in said side members in perpendicular relation thereto and within said three sided enclosure such that said cutter wheel shaft has an axis of rotation perpendicular to the spaced parallel side members, said circular blade having a sharpened outer edge thereon, a positioning wheel rotatably mounted on a positioning wheel shaft, said positioning wheel shaft mounted to said supporting structure in said side members within said three sided enclosure such that said positioning wheel has an axis of rotation perpendicular to the spaced parallel side members, said positioning wheel positioned such that said positioning wheel is adjacent said circular blade and said positioning wheel shaft is parallel to the cutter wheel shaft, said positioning wheel shaft and cutter wheel shaft located in a first plane, a cable drive wheel mounted in a fixed relation on a drive wheel shaft, said drive wheel shaft rotatably mounted in the side members and parallel to the cutter wheel shaft and the positioning wheel shaft in a second plane and having an axis of rotation perpendicular to the spaced, parallel side members, said second plane parallel to said first plane, means for compressing said cable against the cable drive wheel, said cable compressing means comprising a roller wheel rotatably mounted on a roller wheel shaft, said roller wheel shaft mounted in said side members and within said three sided enclosure such that said roller wheel shaft is in said second plane and is parallel to the drive wheel shaft and such that said roller wheel is adjacent the drive wheel;

means for rotating the drive wheel, said drive wheel rotating means connected to the supporting structure and said drive wheel shaft and rotating said drive wheel in said second plane, and a means for rotating the circular blade against the insulation of the cable such that the insulation is split from the cable, said circular blade rotating means comprising a first gear mounted to said cutter wheel shaft, said first gear mating with a second gear, said second gear rotatably mounted to one of said side members, said second gear mating with a third gear, said third gear mounted on the drive wheel shaft such that as the means for rotating the drive wheel is operated the third gear turns the second gear which turns the first gear and the cutter wheel shaft, thereby rotating the cable drive wheel and the circular blade.

2. The apparatus of claim 1 where said circular blade is comprised of heat treated hardened steel.

3. The apparatus of claim 1 wherein the positioning wheel has an outer diameter and a groove therein, said groove having a center area extending around the outer diameter of said positioning wheel, the center area aligning with the sharpened edge of the cutting member such that the cable is received in said center area of said groove.

4. The apparatus of claim 1 where the cable drive wheel has an outer area, said outer area having a cable gripping means thereon.

5. The apparatus of claim 4 where the cable gripping means comprises slotted, spaced, parallel sections in said outer area, said spaced slotted sections parallel to said axis of rotation of said wheel.

6. The apparatus of claim 1 where the means for rotating the drive wheel comprises an electric motor having a drive shaft said electric motor mounted to the supporting structure, said drive shaft connected in fixed relation to the drive wheel shaft such that as said electric motor rotates, the drive shaft, the drive wheel shaft and drive wheel are likewise rotated.

7. The apparatus of claim 6 where the drive shaft includes a coupler mounted thereon, said coupler also mounted to said drive wheel shaft such that said coupler provides a means by which the drive shaft and electric motor are protected from seizure of the drive wheel.

8. The apparatus of claim 1 including a means for adjusting the positioning wheel with respect to the cutting member, said adjustment means mounted to said supporting structure such that the positioning wheel is adjustable to accommodate varying diameters of cable.

9. The apparatus of claim 8 where the adjustment means comprises a pair of spaced support members, each said spaced support member having a first opening therein, said first openings receiving the positioning wheel shaft, each said spaced support member having a second opening therein for receiving elongated guide members, said elongated guide members threaded through said supporting structure and having a tubular member mounted therearound, a connecting shaft connecting the spaced support members, said connecting shaft perpendicular to the parallel, planar side members, a threaded bolt fixed to said connecting shaft and threaded to said supporting structure such that turning the threaded shaft in the supporting structure will move the connecting shaft and the spaced support members thereby adjusting the positioning wheel with respect to the cutting member.

10. The apparatus of claim 9 where each of the first openings are "U" shaped and positioned near an end of the spaced support members allowing the positioning wheel shaft to be placed therein and allowing the positioning wheel shaft and positioning wheel to be removed therefrom when the threaded shaft is turned so as to move the connecting shaft away from the cutting member.

11. The apparatus of claim 1 including a means for adjusting the roller wheel with respect to the drive wheel, said adjustment means mounted to said supporting structure such that the roller wheel is adjustable to accommodate varying sizes of cable.

12. The apparatus of claim 11 where the adjustment means comprises a pair of spaced support members, each said spaced support member having a spaced first opening therein, said first opening receiving the roller wheel shaft, each said spaced support member having a pair of second openings therein for receiving elongated guide members, said elongated guide members threaded through said supporting structure and having a tubular member mounted therearound, a connecting shaft connecting the spaced support members, said connecting shaft perpendicular to the parallel, planar side members, a threaded bolt fixed to said connecting shaft and threaded to said supporting structure, such that turning the threaded shaft in the supporting structure will move the connecting shaft and the spaced support members thereby adjusting the roller wheel with respect to the drive wheel.

13. The apparatus of claim 1 where the cutting member and the drive wheel each have a guard plate mounted thereover such that an operator is protected from injury during operation of the apparatus.

14. The apparatus of claim 1 where the supporting structure is comprised of aluminum plate.

15. An apparatus for stripping the insulation off of cable comprising:

a supporting structure, a circular blade having a sharpened edge, said blade rotatably mounted in said supporting structure, a means for positioning a variety of different diameter cables adjacent said blade mounted in said supporting structure, said positioning means comprising a positioning wheel rotatably mounted over a positioning wheel shaft, said positioning wheel shaft removably mounted in said supporting structure such that the axis of rotation of the positioning wheel is parallel to the axis of rotation of the circular blade and such that said positioning wheel shaft may be removed from the supporting structure and the positioning wheel, thereby allowing a second positioning wheel of a differing size to be placed thereon, each said positioning wheel having a groove therein for receiving a select diameter cable, each said groove extending around the circumference of the positioning wheel and adjacent the sharpened edge of the circular blade, a drive wheel for moving the cable through the blade, said drive wheel rotatably mounted in said supporting structure and having an axis of rotation parallel to the axis of rotation of the circular blade, a means for compressing the cable against the drive wheel, said cable compressing means comprising a roller wheel rotatably mounted in the supporting structure where the axis of rotation of the roller wheel is parallel to the axis of rotation of the drive wheel, said roller wheel mounted in said supporting structure adjacent the drive wheel, a means for rotating the circular blade as the drive wheel is rotated, comprising a gear assembly having a first gear connected to the circular blade, said first gear mating with a second gear, said second gear rotatably mounted to the supporting structure and said second gear mating with a third gear, said third gear rotatably mounted to the supporting structure and connected to the drive wheel such that rotating the drive wheel will rotate the circular blade and thereby split the insulation off of a cable inserted in between the drive wheel and the roller wheel, a means for adjusting the roller wheel with respect to the drive wheel so as to accommodate varying sizes of cable, said means for adjusting the roller wheel with respect to the drive wheel comprising a pair of spaced support members, each said member having a spaced first opening therein, said spaced first opening receiving a shaft therein, said shaft having rotatably mounted thereon the roller wheel, each said member having a pair of second openings therein for receiving elongated guide members, said elongated guide members fixed to said supporting structure and having a tubular member mounted therearound, a connecting shaft connecting the spaced members, said connecting shaft parallel to the axis of rotation of the roller wheel, a threaded bolt fixed to said connecting shaft and threaded to said supporting structure, such that turning the threaded shaft in the supporting structure will move the connecting shaft and the spaced members, thereby adjusting the roller wheel with respect to the drive wheel.

16. The apparatus of claim 15 including means for adjusting the positioning wheel comprising a pair of spaced support members, each said member having a spaced first opening therein, said spaced first opening receiving a shaft therein, said shaft having rotatably mounted thereon the positioning wheel, each said member having a pair of second openings therein for receiving elongated guide members, said elongated guide members fixed to said supporting structure, and having a tubular member mounted therearound, a connecting shaft connecting the spaced members, said connecting shaft parallel to the axis of rotation of the positioning wheel, a threaded bolt fixed to said connecting shaft and threaded to said supporting structure, such that turning the threaded shaft in the supporting structure will move the connecting shaft and the spaced members, thereby adjusting the positioning wheel with respect to the circular blade.

* * * * *